(No Model.) 2 Sheets—Sheet 1.
F. L. RICHTER.
POISON DISTRIBUTER.
No. 472,819. Patented Apr. 12, 1892.
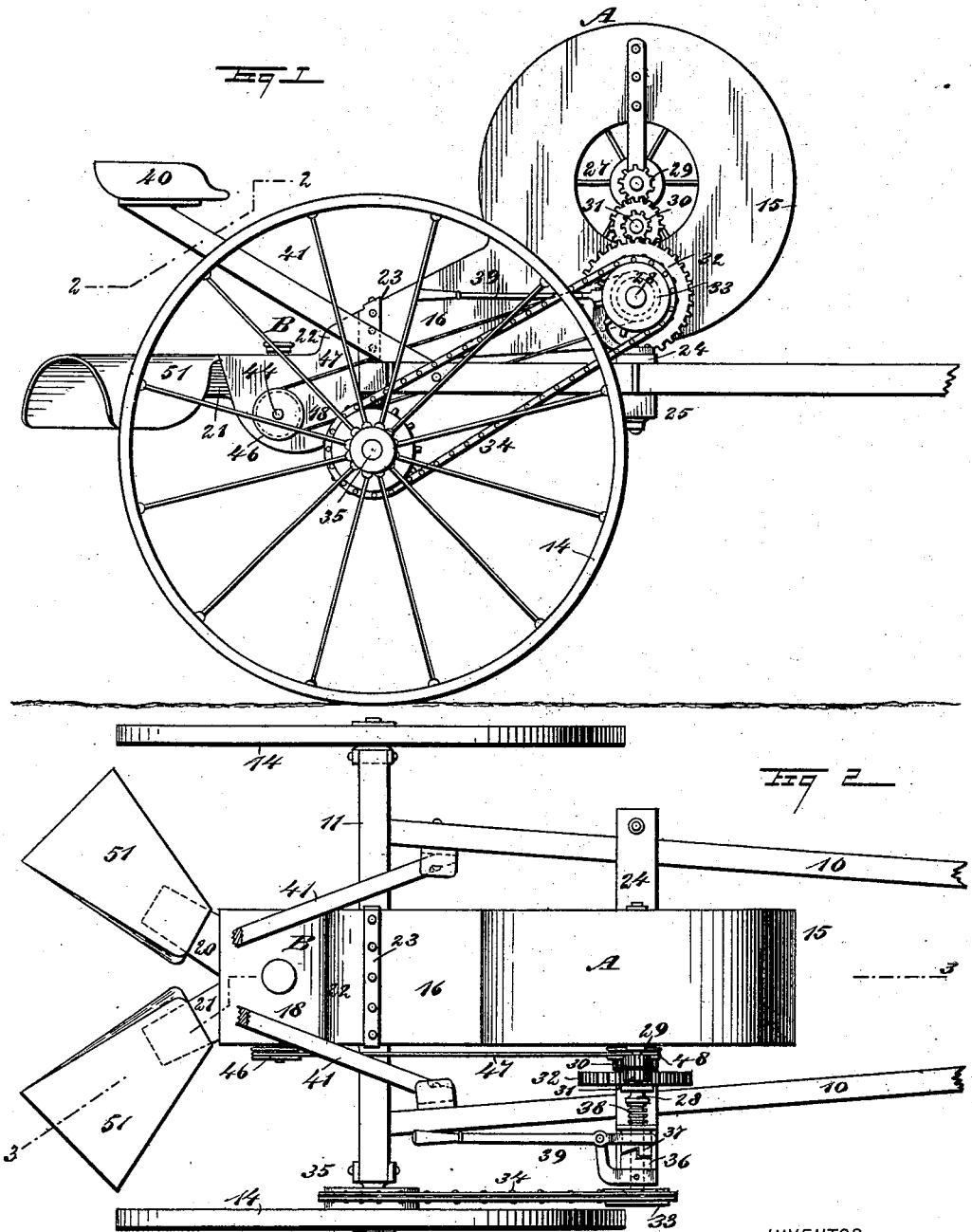
WITNESSES:
L. H. Walker
C. Sedgwick
INVENTOR:
F. L. Richter
BY Munn & Co.
ATTORNEYS (No Model.) 2 Sheets—Sheet 2.
F. L. RICHTER.
POISON DISTRIBUTER.
No. 472,819. Patented Apr. 12, 1892.
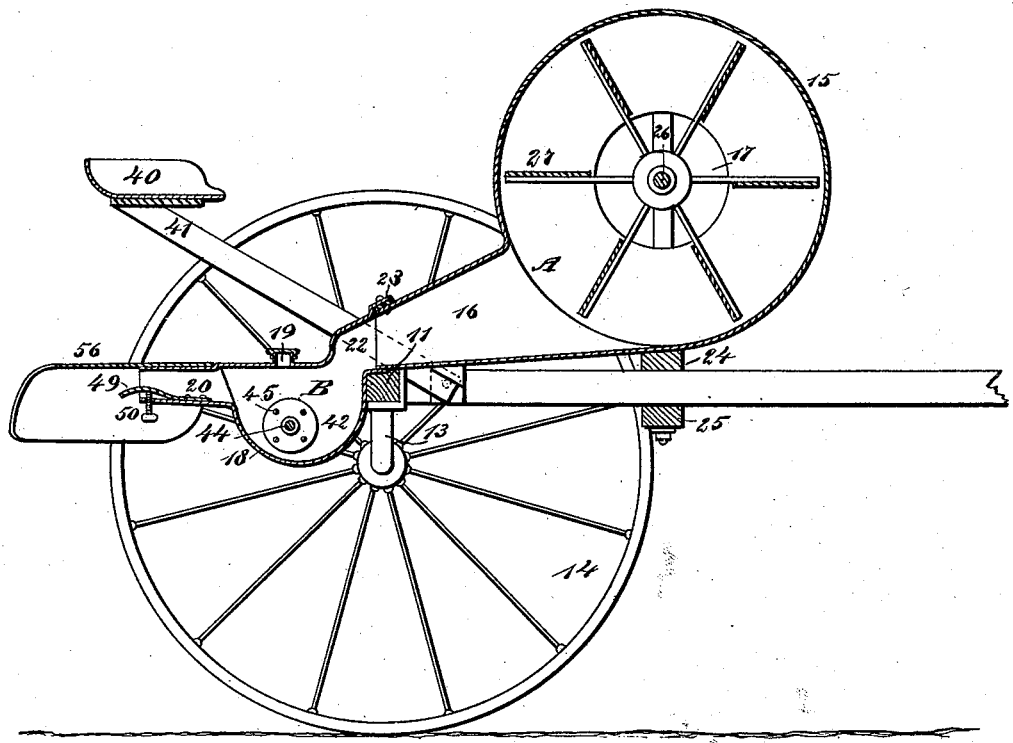
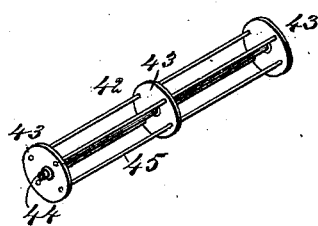
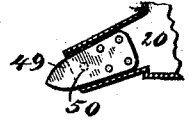
WITNESSES:
H. Walker
C. Sedgwick
INVENTOR:
F. L. Richter
BY
Munn & Co
ATTORNEYS

UNITED STATES PATENT OFFICE.

FRANZ LUDWIG RICHTER, OF SCHULENBURG, TEXAS.

POISON-DISTRIBUTER.

SPECIFICATION forming part of Letters Patent No. 472,819, dated April 12, 1892.

Application filed November 11, 1891. Serial No. 411,580. (No model.)

*To all whom it may concern:*

Be it known that I, FRANZ LUDWIG RICHTER, of Schulenburg, in the county of Fayette and State of Texas, have invented a new and Improved Poison-Distributer, of which the following is a full, clear, and exact description.

My invention relates to an improvement in poison-distributers, and has for its object to provide an implement especially adapted for distributing pulverized paris-green, london-purple, arsenic, and other poisons in a dry state over cotton and other plants.

A further object of the invention is to provide an implement of exceedingly simple and durable construction and capable of attachment to any form of cultivator, and also to provide a means whereby the poison to be delivered from the machine may be regulated as to quantity in a convenient and expeditious manner, and, further, to provide a means whereby the poison as delivered from the machine will be spread over the plants at each side of the machine.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a side elevation of the machine. Fig. 2 is a plan view, partly in section, the section being taken, practically, on the line 2 2 in Fig. 1. Fig. 3 is a longitudinal section taken on the line 3 3 of Fig. 2. Fig. 4 is a detail perspective view of a device for agitating the dry powder; and Fig. 5 is a detail sectional view taken through one of the spouts, illustrating the position of the regulating-tongue.

The shafts 10 converge at their outer or forward ends and are attached at their rear or inner ends to an axle 11, the said axle being provided with spindles 13, which spindles extend downward and outward from the axle, as shown in Fig. 3, and upon these spindles the supporting-wheels 14 of the machine are loosely mounted.

The body of the machine is virtually constructed in two sections—namely, a fan-section A and a powder-receiving section B. The fan-section consists of a circular body 15 and a downwardly and rearwardly extending spout 16. The spout is entirely inclosed, except at its rear end, and the fan-section is also inclosed, except at the central portion of each side, at which point an opening 17 is provided.

The powder-receiving section B comprises a receptacle 18, the bottom of which is preferably semicircular, the top being flat, and the top is provided with a capped opening 19, through which the material is introduced. From the rear portion of the body two spouts 20 and 21 are projected in opposite directions, but little space intervening between the spouts where they join the receptacle, as is also best shown in Fig. 2. These spouts are made somewhat funnel-shaped—that is, they are contracted or made smaller at their outer ends than at their inner ends—and the receptacle 18 is further provided with a chute 22, emanating from the forward upper portion thereof, which chute is connected with the spout-section 16 of the fan-casing. The connection between the spout of the fan-casing and the chute of the receiving-section B is made in such manner that an air and dust tight joint is produced, and this connection is usually effected by making an overlapping seam where the two parts join and introducing within the seam a strip or ribbon 23 of rubber or a like material, as shown in Fig. 3.

The fan-casing rests upon a transverse beam 24, secured upon the shafts, and this beam is usually bolted or otherwise attached to a second cross-beam 25, located at the under portion of the shafts. The rear end of the spout-section of the fan-casing rests upon the axle 11, as does likewise the chute-section of the receptacle 18, the forward side of the receptacle also bearing against the axle. The fan-casing and the chute-section of the receptacle 18 are so located that an inclined passage is formed leading from the interior of the casing into the receptacle 18.

In suitable bearings attached to the outer face of the fan-casing a shaft 26 is journaled, upon which shaft within the casing a fan 27, of any approved construction, is secured. The fan receives movement from a shaft 28, journaled at one end in bearings attached to the outer face of the fan-casing near its lower end, the other extremity of the shaft being journaled in bearings attached to the upper cross-bar 24.

The fan-shaft is provided at one end with a pinion 29, which pinion meshes with a gear 30, the said gear being held to turn upon the fan-casing, and this gear is provided with an attached pinion 31, the said pinion meshing with a large gear 32, fast upon the shaft 28. At the outer extremity of the shaft 28 a sprocket-wheel 33 is loosely mounted, and this sprocket-wheel is connected by a chain belt 34 with a sprocket-wheel 35, formed upon the hub of one of the supporting-wheels 14, as is shown in Fig. 2.

The hub of the sprocket-wheel 33 on the shaft 28 is provided with a clutch-face 36, adapted to be engaged by a clutch 37, held to turn with the shaft 28, the clutch being normally held in engagement with the clutch-face of the sprocket-wheel through the medium of a suitable spring 38.

The clutch is operated through the medium of a shifting-lever 39, which extends upward within convenient reach of the driver's seat 40, said seat being located over the rear portion of the machine, and it is supported by braces 41, attached to the shafts. It will thus be observed that the fan is made to revolve very rapidly, while the shaft may be revolved quite slowly, and that the shaft 28 may be stopped from revolving at any time that the operator may desire, and the distribution of the poisonous powder be stopped at the same time.

Within the receptacle 18, in which the poisonous powder is placed, a cage 42 is held to revolve. (Shown in detail in Fig. 4.) This cage acts as an agitator and keeps the powder constantly in motion while the machine is in operation. The cage is preferably constructed as illustrated, in which two or more disks 43, preferably three disks, are attached to the shaft 44, which shaft is journaled in the sides of the receptacle 18, one end of the shaft extending outward beyond the side of the receptacle, and the disks are connected by a number of rods 45, which rods run parallel with the shaft.

Upon the outer end of the agitator-shaft 44 a pulley 46 is secured, the said pulley being connected by a belt 47 with a similar pulley 48, secured upon the shaft 28, which is the drive-shaft of the machine, near the inner end of said shaft, as is shown in Fig. 2.

In each delivery-spout 20 and 21 a spring-tongue 49 is located, the said tongues being secured at their inner ends to the lower walls of the spout, as shown in Figs. 3 and 5, and the outer portions of the tongues are curved upward and extend outward through and beyond the spouts. By raising or lowering the curved free extremities of the tongues more or less of the powder from the receptacle 18 will be permitted to escape, as when the tongues are raised they decrease the area of the outer ends of the delivery-spouts, and when they are lowered they increase the area of said spouts. The adjustment of the tongues is preferably effected through the medium of set-screws 50, which pass upward through the delivery-spouts to an engagement with the curved portions of the tongues.

In order that the material delivered from the machine may be spread over as great an area as possible, shields 51 are located over and are attached to the delivery-spouts, which shields are semicircular in cross-section, or practically so, and extend some distance rearward beyond the spouts.

In the operation of the machine, the material to be distributed having been placed in the receptacle 18 and the clutch 37 thrown in engagement with the clutch-face of the sprocket-wheel 33, as the implement is drawn forward the drive-shaft is revolved, which communicates motion to the fan and to the agitator 42 in the receptacle 18, the agitator keeping the material in constant motion, while the fan will generate sufficient wind to blow the material from the receptacle through the delivery-spouts to an engagement with the shields 51, from whence the material will fall upon the plants, as the shields are so located that they extend over the plants, one shield extending over a row at each side of the machine.

It will be observed that this machine is exceedingly simple, comprising but few parts, that it is effective in operation, and that it is exceedingly economic. If in practice it is found desirable, the lever 39 may be operated by the foot of the person seated upon the machine instead of being operated by the hand, as heretofore mentioned, and the gearing through the medium of which the fan-shaft is driven from the main shaft 28 may be varied according to the speed at which it is desired that the fan shall run.

Having thus described my invention, I claim as new and desire to secure by Letters Patent—

1. A poison-distributer comprising a receptacle having an agitator in its lower portion, a blower delivering into its upper portion above the agitator, and a discharge-pipe leading from the upper portion of the opposite end of the receptacle and provided with a regulating-tongue, substantially as set forth.

2. In a poison-distributer, the combination, with delivery or discharge pipe provided with a tongue 49, having an adjusting-screw 50, of the deflector-shields 51, curved downward at their longitudinal edges, substantially as set forth.

3. In a machine of the character described, the combination, with a receptacle adapted to contain a powder, an agitator located in the receptacle and capable of revolving, and spouts connected with and extending in opposite directions from the rear portion of the receptacle, of spring-tongues located in the bottom of the said spouts, an adjusting mechanism connected with the tongues, shields attached to the spouts and extending beyond their rear ends, a fan, a covered connection between the fan and the forward end of the receptacle, and a driving mechanism, substantially as described, connected with the fan and the agitator-shafts, as set forth.

FRANZ LUDWIG RICHTER.

Witnesses:
 JNO. F. HENDREN,
 FERDINAND POPPE.